US011135772B2

(12) United States Patent
Fujishima et al.

(10) Patent No.: US 11,135,772 B2
(45) Date of Patent: Oct. 5, 2021

(54) ADDITIVE-MANUFACTURING HEAD AND MANUFACTURING MACHINE

(71) Applicant: DMG MORI CO., LTD., Yamatokoriyama (JP)

(72) Inventors: Makoto Fujishima, Yamatokoriyama (JP); Yuhei Mezawa, Yamatokoriyama (JP); Edvard Govekar, Yamatokoriyama (JP); Gideon N. Levy, Yamatokoriyama (JP); Andrej Jeromen, Yamatokoriyama (JP); Alexander Kuznetsov, Yamatokoriyama (JP)

(73) Assignee: DMG MORI CO., LTD., Yamatokoriyama (JP)

( * ) Notice: Subject to any disclaimer, the term of this patent is extended or adjusted under 35 U.S.C. 154(b) by 203 days.

(21) Appl. No.: 16/347,025

(22) PCT Filed: May 16, 2017

(86) PCT No.: PCT/JP2017/018386
§ 371 (c)(1),
(2) Date: May 2, 2019

(87) PCT Pub. No.: WO2018/211594
PCT Pub. Date: Nov. 22, 2018

(65) Prior Publication Data
US 2019/0270246 A1    Sep. 5, 2019

(51) Int. Cl.
*B29C 64/20* (2017.01)
*B29C 64/268* (2017.01)
(Continued)

(52) U.S. Cl.
CPC ............ *B29C 64/268* (2017.08); *B22F 3/105* (2013.01); *B22F 3/16* (2013.01); *B23K 26/02* (2013.01);
(Continued)

(58) Field of Classification Search
CPC ...... B29C 64/268; B29C 64/209; B23K 26/02
See application file for complete search history.

(56) References Cited

U.S. PATENT DOCUMENTS

2016/0236279 A1* 8/2016 Ashton ................. B22F 3/1055

FOREIGN PATENT DOCUMENTS

EP        3219411 B1 *  8/2020  ............. C22C 33/02
FR        2823688 A1 * 10/2002  ......... B23K 26/0734
(Continued)

OTHER PUBLICATIONS

International Search Report dated Jul. 18, 2017 in PCT/JP2017/018386 filed on May 16, 2017.

*Primary Examiner* — Joseph S Del Sole
*Assistant Examiner* — Jamel M Nelson
(74) *Attorney, Agent, or Firm* — Oblon, McClelland, Maier & Neustadt, L.L.P.

(57) ABSTRACT

An additive-manufacturing head includes: a ring-shape laser beam forming unit having axicon lenses facing each other and a convex lens between the axicon lenses to form a laser beam entering through the axicon lens into a ring-shape laser beam and emit the ring-shape laser beam from the other axicon lens; a lens moving mechanism to move the convex lens in the optical axis direction of the laser beam; a laser beam emitting unit to emit the ring-shape laser beam toward a workpiece; and a material powder feeding tube having an outlet which is disposed inside the ring-shape laser beam emitted from the laser beam emitting unit and from which material powder is released, to feed the material powder
(Continued)

from the outlet toward the workpiece. Accordingly, the additive-manufacturing head capable of freely controlling the size of the laser-beam-irradiated region and the laser beam intensity distribution on the workpiece is provided.

7 Claims, 9 Drawing Sheets

(51) Int. Cl.
| | |
|---|---|
| B29C 64/209 | (2017.01) |
| B23K 26/02 | (2014.01) |
| B23K 26/34 | (2014.01) |
| B23K 26/21 | (2014.01) |
| B29C 64/393 | (2017.01) |
| B33Y 50/02 | (2015.01) |
| B23K 26/144 | (2014.01) |
| B23K 26/073 | (2006.01) |
| B29C 64/153 | (2017.01) |
| B33Y 30/00 | (2015.01) |
| B22F 3/105 | (2006.01) |
| B22F 3/16 | (2006.01) |
| B33Y 10/00 | (2015.01) |

(52) U.S. Cl.
CPC .......... *B23K 26/073* (2013.01); *B23K 26/144* (2015.10); *B23K 26/21* (2015.10); *B23K 26/34* (2013.01); *B29C 64/153* (2017.08); *B29C 64/209* (2017.08); *B29C 64/393* (2017.08); *B33Y 30/00* (2014.12); *B33Y 50/02* (2014.12); *B33Y 10/00* (2014.12)

(56) References Cited

FOREIGN PATENT DOCUMENTS

| | | |
|---|---|---|
| JP | 57-102267 A | 6/1982 |
| JP | 62-177107 A | 8/1987 |
| JP | 2004-322183 A | 11/2004 |
| JP | 2008-134468 A | 6/2008 |
| JP | 2008-260035 A | 10/2008 |
| JP | 2009-186936 A | 8/2009 |
| JP | 2009-259860 A | 11/2009 |
| JP | 2012-115854 A | 6/2012 |
| WO | WO-2004020141 A1 * 3/2004 ........... C03B 33/093 |

* cited by examiner

ADDITIVE-MANUFACTURING HEAD AND MANUFACTURING MACHINE

CROSS-REFERENCE TO RELATED APPLICATIONS

This application is a United States national stage application of International Application No. PCT/JP2017/018386, filed May 16, 2017, which designates the United States, and the entire content of the above application is hereby incorporated herein by reference in entirety.

TECHNICAL FIELD

The present invention relates to an additive-manufacturing head and a manufacturing machine.

BACKGROUND ART

As a conventional apparatus for implementing additive manufacturing, a laser processing apparatus aiming to perform processing with a high processing quality is disclosed for example in Japanese Patent Laying-Open No. 2009-259860 (PTD 1).

The laser processing apparatus disclosed in PTD 1 includes: a laser source emitting a laser beam; a holding table holding a workpiece to be processed; an optical system generating a laser beam having a ring-band-shaped cross section from the laser beam emitted from the laser source, and applying the laser beam with a variable radius to the workpiece held on the holding table; and a controller configured to change the width of the output of the laser source or the ring-band-shaped laser beam, in a direction of suppressing a change of the peak intensity in the same orientation of the ring-band-shaped laser beam, when the radius of the ring-band-shaped laser beam is changed.

In addition, Japanese Patent Laying-Open No. 2009-186936 (PTD 2), Japanese Patent Laying-Open No. 2008-260035 (PTD 3), Japanese Patent Laying-Open No. 2008-134468 (PTD 4), Japanese Patent Laying-Open No. 2012-115854 (PTD 5), Japanese Patent Laying-Open No. 62-177107 (PTD 6), Japanese Patent Laying-Open No. 57-102267 (PTD 7), and Japanese Patent Laying-Open No. 2004-322183 (PTD 8) also disclose various apparatuses for implementing additive manufacturing.

CITATION LIST

Patent Document

PTD 1: Japanese Patent Laying-Open No. 2009-259860
PTD 2: Japanese Patent Laying-Open No. 2009-186936
PTD 3: Japanese Patent Laying-Open No. 2008-260035
PTD 4: Japanese Patent Laying-Open No. 2008-134468
PTD 5: Japanese Patent Laying-Open No. 2012-115854
PTD 6: Japanese Patent Laying-Open No. 62-177107
PTD 7: Japanese Patent Laying-Open No. 57-102267
PTD 8: Japanese Patent Laying-Open No. 2004-322183

SUMMARY OF INVENTION

Technical Problem

Creation of a three-dimensional form on a workpiece by attaching materials on the workpiece is implemented by a method of additive manufacturing. The mass of the workpiece after additive manufacturing has been increased relative to the workpiece before additive manufacturing. Examples of such an additive manufacturing method include a directed energy deposition method and a powder bed fusion method. In a process of the directed energy deposition method, material powder is fed from an additive-manufacturing head to a workpiece, and the workpiece is irradiated with a laser beam. In a process of the powder bed fusion method, a powder bed is selectively fused and hardened by heat in the vicinity of the surface to form a layer.

Advantages of the directed energy deposition method are as follows:

(a) material powder can be deposited at a higher speed as compared with the powder bed fusion method;

(b) multiple materials in powder form can be deposited at the same time;

(c) a deposited material can be coated by feeding material powder different from a base material;

(d) additive manufacturing can be performed for a large-sized workpiece by moving the additive-manufacturing head in a wide area; and (e) since partial deposition of material powder is possible, the directed energy deposition method can be used for a process of repairing a die, blade, or the like.

On the contrary, disadvantages of the directed energy deposition method are as follows:

(a) the material powder deposition accuracy is inferior to that of the powder bed fusion method; and (b) the combination of laser output, the amount of material powder to be fed, the amount of carrier gas to be fed, and the feed rate, for example, is complicated, which makes it difficult to optimize these parameters.

As seen from the above, the directed energy deposition method has many advantages. However, the material powder usage efficiency depends on the combination of process parameters. In the case where the material powder usage efficiency is low, the following problems arise.

(a) Because the material powder is expensive, a device is necessary for collecting the material powder accumulated in the machining chamber. The material powder which is left uncollected is to be discarded.

(b) Maintenance of the machining chamber is difficult. The material powder which enters a mechanism such as a guide can cause a failure in the manufacturing machine.

(c) Material powder such as aluminum requires appropriate treatment.

However, regarding the directed energy deposition method, the combination of process parameters is complicated as described above. In addition, when the material powder is fed from outside the laser beam, it is difficult to prevent scattering of the material powder to the outside of the melt pool. It is therefore extremely difficult to achieve a material powder usage efficiency close to 100%.

In order to improve the material powder usage efficiency, a possible method is to emit a ring-shape laser beam from an additive-manufacturing head toward a workpiece and feed material powder from inside the ring-shape laser beam toward the workpiece. In the case where such a method is used, however, the size of the ring-shape laser beam (both the outer diameter and the inner diameter) varies depending on the distance from the focal position of the laser beam, and it is therefore necessary to provide means for freely controlling the size of the laser-beam-irradiated region on the workpiece.

Accordingly, an object of the present invention is to solve the above-described problems and provide an additive-manufacturing head and a manufacturing machine that can freely control the size of the laser-beam-irradiated region on the workpiece.

Solution to Problem

An additive-manufacturing head according to the present invention is an additive-manufacturing head performing additive manufacturing by feeding material powder to a workpiece and irradiating the workpiece with a laser beam. The additive-manufacturing head includes: a ring-shape laser beam forming unit including a first axicon lens and a second axicon lens disposed to face each other in an optical axis direction of the laser beam, and a convex lens disposed between the first axicon lens and the second axicon lens, to form the laser beam entering through the first axicon lens into a ring-shape laser beam and emit the ring-shape laser beam from the second axicon lens; a first moving mechanism to move the convex lens in the optical axis direction of the laser beam; a laser beam emitting unit to emit the ring-shape laser beam toward the workpiece; and a material feeding unit having an outlet which is disposed inside the ring-shape laser beam emitted from the laser beam emitting unit and from which the material powder is released, to feed the material powder from the outlet toward the workpiece.

Regarding the additive-manufacturing head configured in such a manner, the first moving mechanism moves the convex lens to thereby change the distance between the first axicon lens and the convex lens in the optical axis direction of the laser beam. Accordingly, the size of the laser-beam-irradiated region on the workpiece can be controlled freely.

Preferably, the additive-manufacturing head further includes a second moving mechanism to move the material feeding unit so that a distance between the outlet and the workpiece is changed.

Regarding the additive-manufacturing head configured in such a manner, the laser-beam-irradiated region on the workpiece and the diffusion range of the material powder fed toward the workpiece are adapted to each other to thereby enable additive manufacturing for the workpiece to be performed efficiently.

A manufacturing machine according to the present invention is a manufacturing machine capable of additive manufacturing for a workpiece. The manufacturing machine includes: an additive-manufacturing head as described above; a third moving mechanism to move at least one of the additive-manufacturing head and the workpiece; and a controller to control movement of the convex lens by the first moving mechanism and movement of at least one of the additive-manufacturing head and the workpiece by the third moving mechanism. The controller includes: a storage unit to store data regarding respective relations of a distance between the workpiece and the laser beam emitting unit and a distance between the first axicon lens and the convex lens in the optical axis direction of the laser beam, to a size of a laser-beam-irradiated region formed on the workpiece; and a control unit to determine the distance between the workpiece and the laser beam emitting unit and the distance between the first axicon lens and the convex lens in the optical axis direction of the laser beam, by specifying a size of the laser-beam-irradiated region to be formed on the workpiece and checking the specified laser-beam-irradiated region against the data stored in the storage unit.

Regarding the manufacturing machine configured in such a manner, the distance between the workpiece and the laser beam emitting unit and the distance between the first axicon lens and the convex lens are controlled to thereby enable the size of the laser-beam-irradiated region on the workpiece to be controlled freely.

Preferably, the manufacturing machine further includes a laser beam oscillator to generate the laser beam traveling toward the ring-shape laser beam forming unit. The controller further controls output of the laser beam generated by the laser beam oscillator. The control unit determines the output of the laser beam so that an energy density per unit area of the laser-beam-irradiated region and a melt pool temperature are constant when the laser-beam-irradiated region is changed.

The manufacturing machine configured in such a manner can perform additive manufacturing for a workpiece stably even when the laser-beam-irradiated region on the workpiece is changed.

Preferably, as the distance between the first axicon lens and the convex lens in the optical axis direction of the laser beam increases, a thickness of the ring-shape laser beam in radial direction changes in a first section in which the thickness decreases gradually toward a local minimum and a second section in which the thickness increases gradually from the local minimum. A rate of change of the thickness of the ring-shape laser beam in the second section is smaller than a rate of change of the thickness of the ring-shape laser beam in the first section. Based on the data stored in the storage unit, the control unit determines a distance in the second section as the distance between the first axicon lens and the convex lens in the optical axis direction of the laser beam.

The manufacturing machine configured in such a manner can control the thickness of the ring-shape laser beam with higher precision.

Advantageous Effects of Invention

As described above, according to the present invention, the additive-manufacturing head and the manufacturing machine that can freely control the laser-beam-irradiated region on the workpiece can be provided.

DESCRIPTION OF EMBODIMENTS

An embodiment of the present invention will be described with reference to the drawings. In the drawings referenced below, the same or corresponding members are denoted by the same numerals.

Figure 1:
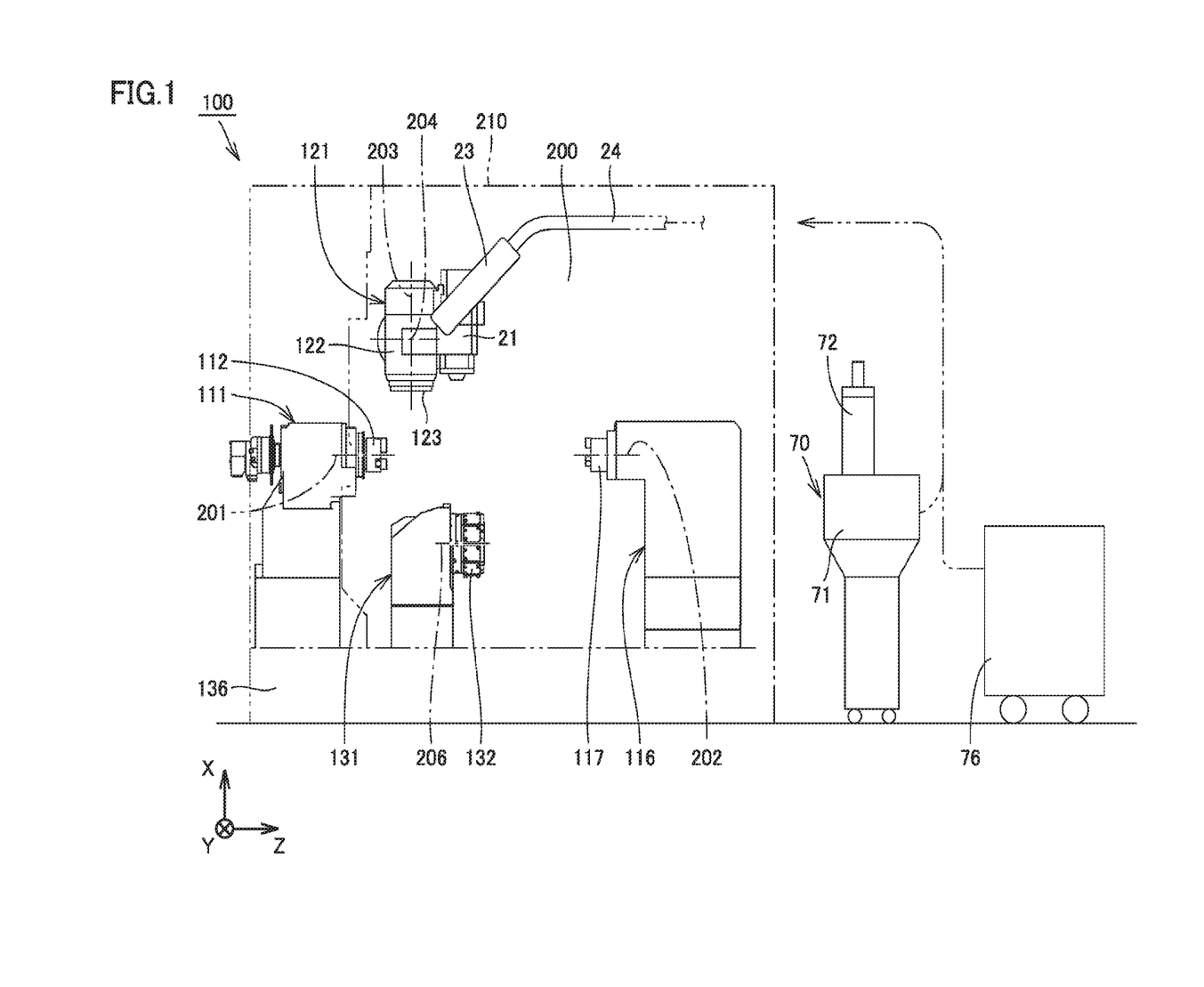
FIG. 1 is a front view showing a manufacturing machine in an embodiment of the present invention.
Figure 2:
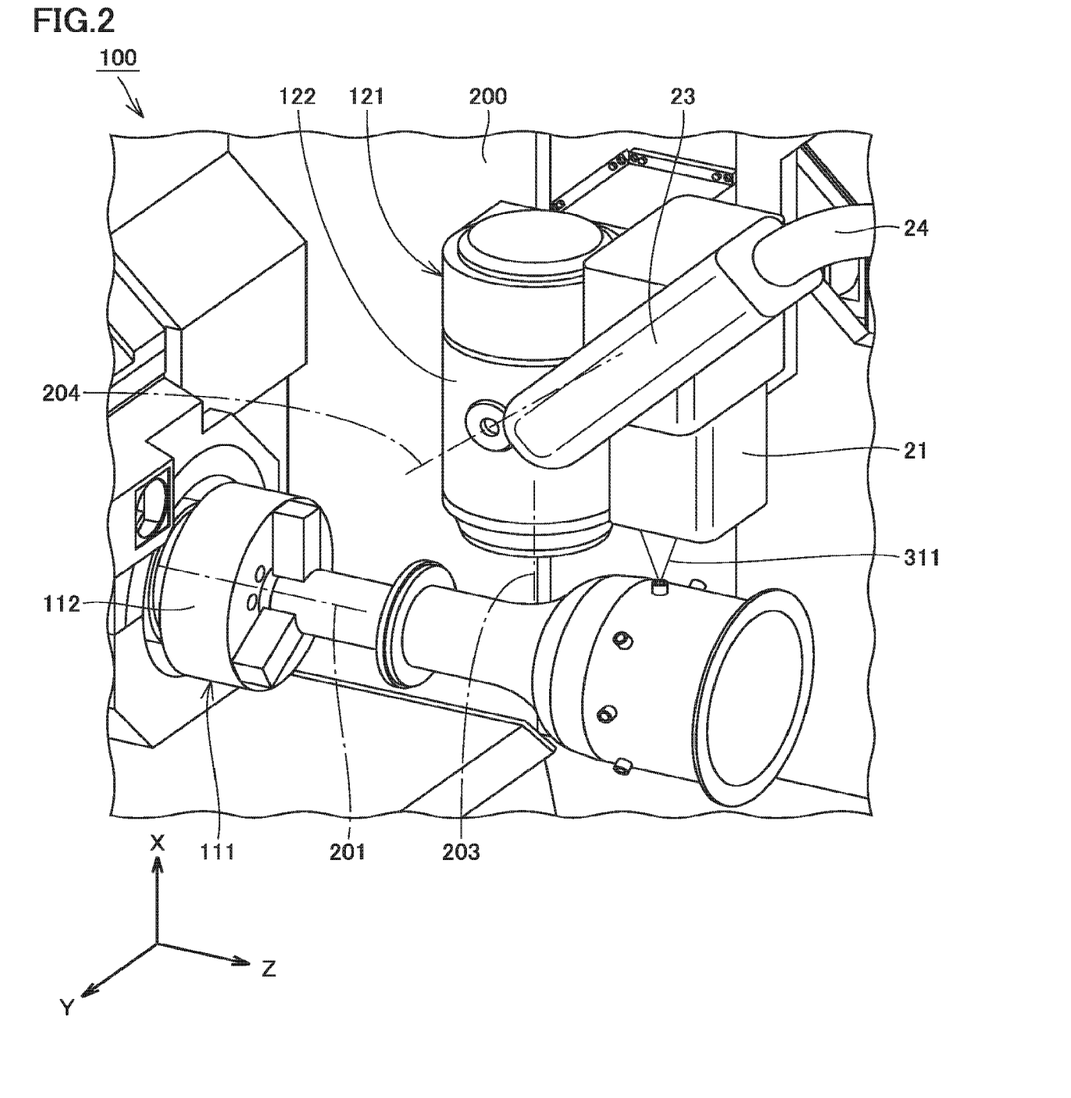
FIG. 2 is a perspective view showing an inside of a machining area when additive manufacturing is performed in the manufacturing machine in FIG. 1.

FIG. 1 is a front view showing a manufacturing machine in an embodiment of the present invention. In FIG. 1, a cover body which presents the appearance of the manufacturing machine is shown as if it is transparent, so that the inside of the manufacturing machine is visible. FIG. 2 is a perspective view showing an inside of a machining area when additive manufacturing is performed in the manufacturing machine in FIG. 1.

Referring to FIGS. 1 and 2, manufacturing machine 100 is an AM/SM hybrid manufacturing machine capable of additive manufacturing (AM) for a workpiece and subtractive manufacturing (SM) for a workpiece. Manufacturing machine 100 has a turning function by means of a stationary tool and a milling function by means of a rotary tool, as functions of SM.

First, a description will be given of the overall structure of manufacturing machine 100. Manufacturing machine 100 includes a bed 136, a first headstock 111, a second headstock 116, a tool spindle 121, and a lower tool rest 131.

Bed 136 is a base member for supporting first headstock 111, second headstock 116, tool spindle 121, and lower tool rest 131, and mounted on an installation surface in a factory or the like. First headstock 111, second headstock 116, tool spindle 121, and lower tool rest 131 are provided in a machining area 200 defined by a splashguard 210.

First headstock 111 and second headstock 116 are provided to face each other in a z-axis direction which extends horizontally. First headstock 111 and second headstock 116 have a first spindle 112 and a second spindle 117, respectively, for rotating a workpiece in a turning process which is performed by means of a stationary tool. First spindle 112 is provided rotatably about a central axis 201 which is in parallel with the z axis. Second spindle 117 is provided rotatably about a central axis 202 which is in parallel with the z axis. First spindle 112 and second spindle 117 are each provided with a chuck mechanism for detachably holding a workpiece.

Second headstock 116 is provided to be movable in the z-axis direction by means of any of various feed mechanisms, guide mechanisms, a servo motor, and the like.

Tool spindle (upper tool rest) 121 causes a rotary tool to rotate in a milling process which is performed by means of the rotary tool. Tool spindle 121 is provided rotatably about a central axis 203 which is in parallel with an x axis extending vertically. Tool spindle 121 is provided with a clamp mechanism for detachably holding the rotary tool.

Tool spindle 121 is supported above bed 136 through a column or the like (not shown). Tool spindle 121 is provided to be movable, by any of various feed mechanisms, guide mechanisms, a servo motor, and the like provided on the column or the like, in the x-axis direction, a y-axis direction which extends horizontally and orthogonally to the z-axis direction, and the z-axis direction. The position of machining by the rotary tool attached to tool spindle 121 moves three-dimensionally. Further, tool spindle 121 is provided to be swivelable about a central axis 204 which is in parallel with the y axis.

Although not shown in FIG. 1, an automatic tool-change device for automatically changing a tool attached to tool spindle 121 and a tool magazine storing replacement tools to be attached tool spindle 121 are provided around first headstock 111.

To lower tool rest 131, a plurality of stationary tools for turning are attached. Lower tool rest 131 has a so-called turret shape, and a plurality of stationary tools are attached radially to lower tool rest 131. Lower tool rest 131 is provided for swivel indexing.

More specifically, lower tool rest 131 includes a swivel unit 132. Swivel unit 132 is provided to be swivelable about a central axis 206 which is in parallel with the z axis. At positions located at intervals in the direction of the circumference centered at central axis 206, tool holders for holding stationary tools are attached. Swivel unit 132 swivels about central axis 206 to thereby move the stationary tools held by the tool holders, and a stationary tool to be used for turning is indexed.

Lower tool rest 131 is supported above bed 136 through a saddle or the like (not shown). Lower tool rest 131 is provided to be movable in the x-axis direction and the z-axis direction, by any of various feed mechanisms, guide mechanisms, a servo motor, and the like provided on the saddle or the like.

Manufacturing machine 100 further includes an additive-manufacturing head 21. Additive-manufacturing head 21 performs additive manufacturing (directed energy deposition) by feeding material powder to a workpiece and irradiating the workpiece with laser light (laser beam). As the material powder, stainless, Inconel (registered trademark), or titanium alloy, or the like, for example, may be used.

Additive-manufacturing head 21 is provided to be attachable to and detachable from tool spindle 121. When additive manufacturing is performed, additive-manufacturing head 21 is attached to tool spindle 121. Tool spindle 121 moves in the x-axis direction, the y-axis direction, and the z-axis direction to thereby three-dimensionally displace the position of additive manufacturing by additive-manufacturing head 21. When subtractive manufacturing is performed, additive-manufacturing head 21 is separated from tool spindle 121 and stored in a head stocker (not shown).

Tool spindle 121 is provided with a clamp mechanism. When additive-manufacturing head 21 is attached to tool spindle 121, the clamp mechanism operates to couple additive-manufacturing head 21 to tool spindle 121. An example of the clamp mechanism may be a mechanism obtaining a clamping state through a spring force and obtaining an unclamping state through a hydraulic pressure.

Manufacturing machine 100 further includes a powder feeder 70, a laser beam oscillator 76, and a cable 24.

Powder feeder 70 introduces material powder to be used for additive manufacturing, toward additive-manufacturing head 21 in machining area 200. Powder feeder 70 includes a powder hopper 72 as a tank portion, and a mixing unit 71. Powder hopper 72 forms a closed space for storing material powder to be used for additive manufacturing. Mixing unit 71 mixes the material powder stored in powder hopper 72 with carrier gas for the material powder.

Laser beam oscillator 76 generates a laser beam to be used for additive manufacturing. Cable 24 is made up of an optical fiber for directing the laser beam from laser beam oscillator 76 toward additive-manufacturing head 21, pipes for directing material powder from powder feeder 70 toward additive-manufacturing head 21, and a tube member which encloses the pipes.

Figure 3:
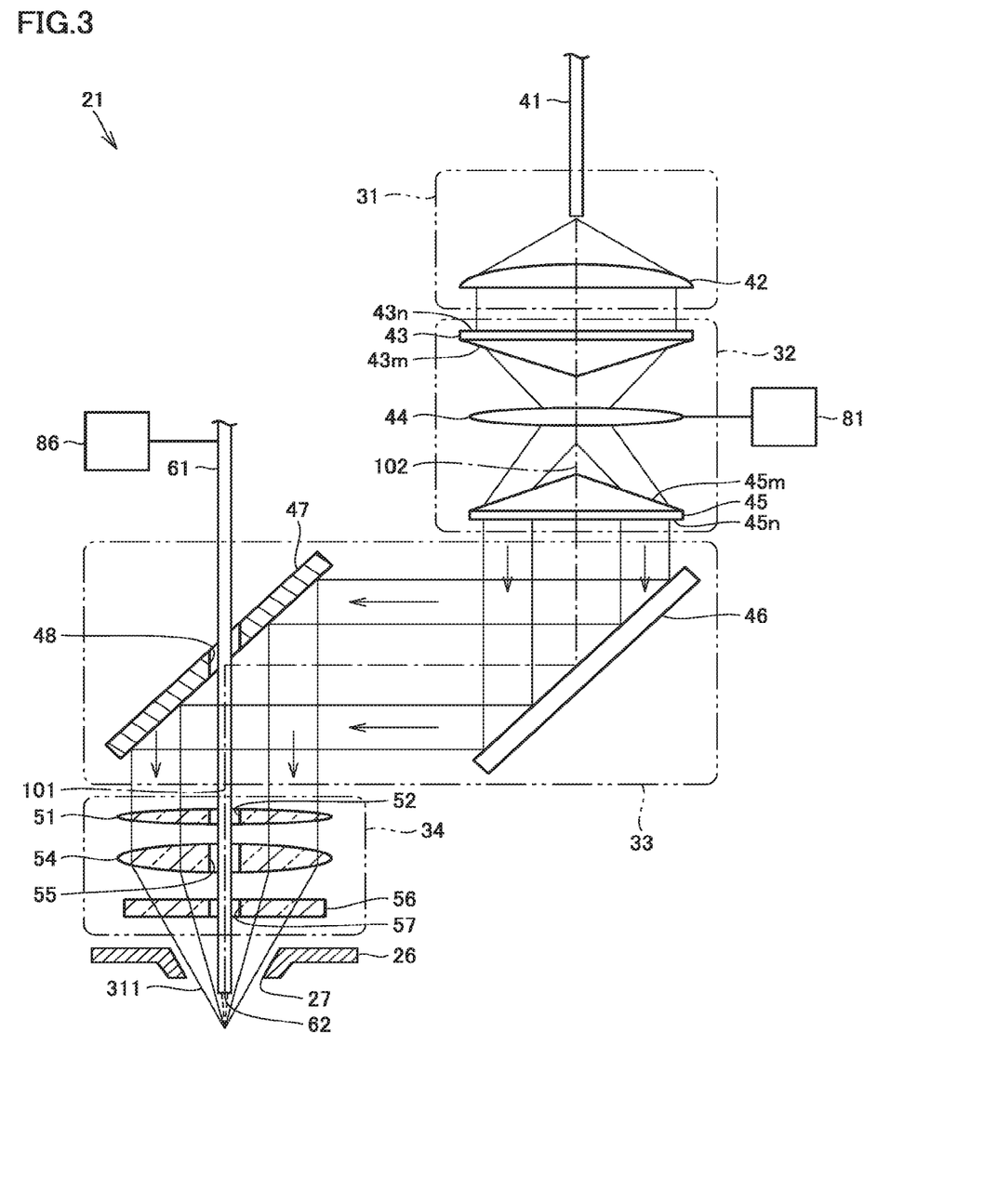
FIG. 3 is a diagram showing an internal structure of an additive-manufacturing head in FIGS. 1 and 2.

Next, a detailed description will be given of a structure of additive-manufacturing head 21. FIG. 3 is a diagram showing an internal structure of the additive-manufacturing head in FIGS. 1 and 2.

Referring to FIG. 3, additive-manufacturing head 21 includes, as optical systems for emitting an externally introduced laser beam toward a workpiece, a laser beam collimating unit 31, a ring-shape laser beam forming unit 32, a laser beam guiding unit 33, and a laser beam emitting unit 34.

Laser beam collimating unit 31, ring-shape laser beam forming unit 32, laser beam guiding unit 33, and laser beam emitting unit 34 are arranged in this order from upstream to downstream of an optical path of the laser beam in additive-manufacturing head 21.

A laser beam from cable 24 (see FIGS. 1 and 2) is introduced through an optical fiber 41 into laser beam collimating unit 31. Laser beam collimating unit 31 includes a collimation lens 42. Collimation lens 42 is provided on a central axis 102. Laser beam collimating unit 31 produces, by means of collimation lens 42, parallel rays from the laser beam which is input from optical fiber 41, and sends the parallel rays toward ring-shape laser beam forming unit 32.

Ring-shape laser beam forming unit 32 includes an axicon lens 43, an axicon lens 45, and a convex lens 44. Axicon lens 43, convex lens 44, and axicon lens 45 are arranged in this order from upstream to downstream of the optical path of the laser beam in additive-manufacturing head 21. Axicon lens 43, convex lens 44, and axicon lens 45 are provided on central axis 102.

Axicon lens 43 has one surface 43*m* in the shape of a conical surface and the other surface 43*n* in the shape of a planar surface. Axicon lens 45 has one surface 45*m* in the shape of a conical surface and the other surface 45*n* in the shape of a planar surface. Axicon lens 43 and axicon lens 45 are arranged so that one surface 43*m* of axicon lens 43 faces one surface 45*m* of axicon lens 45. Convex lens 44 is disposed between axicon lens 43 and axicon lens 45. Convex lens 44 may be a plano-convex lens (lens of which one side is convex and the other side is planar) or a biconvex lens.

Ring-shape laser beam forming unit 32 forms the laser beam which is input from laser beam collimating unit 31 into a ring shape through axicon lens 43, convex lens 44, and axicon lens 45. The laser beam which is output from ring-shape laser beam forming unit 32 is in the shape of a ring, namely the shape of a closed band around central axis 102 as seen in a cross section along a plane orthogonal to the direction in which the laser beam travels. In the present embodiment, ring-shape laser beam forming unit 32 forms the laser beam input from laser beam collimating unit 31 into a circular ring-shape. More specifically, axicon lens 43 forms the laser beam into a circular ring-shape, convex lens 44 causes the ring-shape laser beam to be concentrated (decreased in thickness), and axicon lens 45 turns the ring-shape laser beam into parallel light. The ring-shape laser beam emitted from ring-shape laser beam forming unit 32 is centered on central axis 102 and travels in the axial direction of central axis 102.

Laser beam guiding unit 33 includes a guide mirror 46 and a guide mirror 47. Guide mirror 46 and guide mirror 47 are arranged in this order from upstream to downstream of the optical path of the laser beam in additive-manufacturing head 21. Guide mirror 46 is provided on central axis 102. Guide mirror 46 is provided to be inclined with respect to central axis 102. Guide mirror 47 is provided on a central axis 101 which runs in parallel with central axis 102. Guide mirror 47 is provided to be inclined with respect to central axis 101.

Laser beam guiding unit 33 guides the ring-shape laser beam which is input from ring-shape laser beam forming unit 32 toward laser beam emitting unit 34, through reflection by guide mirror 46 and guide mirror 47. The ring-shape laser beam which is output from laser beam guiding unit 33 is centered on central axis 101 and travels in the axial direction of central axis 101.

Laser beam emitting unit 34 includes a condenser lens 51, a condenser lens 54, and a protective lens 56. Condenser lens 51, condenser lens 54, and protective lens 56 are arranged in this order from upstream to downstream of the optical path of the laser beam in additive-manufacturing head 21. Condenser lens 51, condenser lens 54, and protective lens 56 are provided on central axis 101.

Laser beam emitting unit 34 emits the ring-shape laser beam which is input from laser beam guiding unit 33 toward a workpiece. Laser beam emitting unit 34 concentrates the ring-shape laser beam emitted toward the workpiece, through condenser lens 51 and condenser lens 54. The ring-shape laser beam emitted from laser beam emitting unit 34 is centered on central axis 101 and travels in the axial direction of central axis 101. Protective lens 56 is provided for protecting the lens system installed in additive-manufacturing head 21 from the external ambient.

The shape of the laser beam emitted toward a workpiece may be any ring shape without being limited to a particular shape. Various prisms may be used in ring-shape laser beam forming unit 32 to form laser beams in various ring shapes.

Additive-manufacturing head 21 includes a material powder feeding tube 61, as a mechanism for feeding material powder to a workpiece.

Material powder feeding tube 61 has a pipe shape capable of delivering material powder. Material powder feeding tube 61 is provided along central axis 101. Material powder is introduced from cable 24 (see FIGS. 1 and 2) into material powder feeding tube 61. Material powder feeding tube 61 has an outlet 62. Outlet 62 is an opening of material powder feeding tube 61 releasing material powder. Material powder feeding tube 61 feeds material powder from outlet 62 toward a workpiece.

Outlet 62 is disposed inside the ring-shape laser beam emitted from laser beam emitting unit 34. Outlet 62 is provided on central axis 101. Feed of the material powder from outlet 62 toward a workpiece and emission of the ring-shape laser beam from laser beam emitting unit 34 toward the workpiece are coaxial with central axis 101 and coaxial with each other.

Outlet 62 is disposed downstream of condenser lens 51 and condenser lens 54 on the optical path of the laser beam in additive-manufacturing head 21. Outlet 62 is provided downstream of protective lens 56 on the optical path of the laser beam in additive-manufacturing head 21.

A through hole 48 is formed in guide mirror 47. Through hole 48 is formed to be located on central axis 101 and penetrate guide mirror 47. Through hole 48 has an opening larger than a cross section of material powder feeding tube 61 along a plane orthogonal to central axis 101. Material powder feeding tube 61 penetrates through hole 48.

In condenser lens 51, condenser lens 54, and protective lens 56, a through hole 52, a through hole 55, and a through hole 57 are formed, respectively. Through hole 52, through hole 55, and through hole 57 are formed to be provided on central axis 101 and penetrate condenser lens 51, condenser lens 54, and protective lens 56, respectively. Through hole 52, through hole 55, and through hole 57 each have an opening larger than a cross section of material powder feeding tube 61 along a plane orthogonal to central axis 101. Material powder feeding tube 61 penetrates through holes 52, 55, and 57.

Additive-manufacturing head 21 includes a cover body 26. Cover body 26 has the shape of a casing and forms a space which houses condenser lens 51, condenser lens 54, and protective lens 56. An opening 27 is formed in cover body 26. Opening 27 is provided on central axis 101. Opening 27 is located to face a surface of a workpiece during additive manufacturing. Opening 27 allows the space housing condenser lens 51, condenser lens 54, and protective lens 56 to communicate with the external space. The ring-shape laser beam is emitted from laser beam emitting unit 34 to the external space through opening 27.

In the axial direction of central axis 101, outlet 62 is preferably located in the external space, namely located outward with respect to opening 27. In this case, outlet 62 can be disposed closer to a workpiece.

Outlet 62 may be located identically to opening 27 in the axial direction of central axis 101, or provided in cover body 26. As long as outlet 62 is located inside the ring-shape laser beam emitted from laser beam emitting unit 34, the position of outlet 62 is not particularly limited, and may be displaced from central axis 101.

Figure 4:
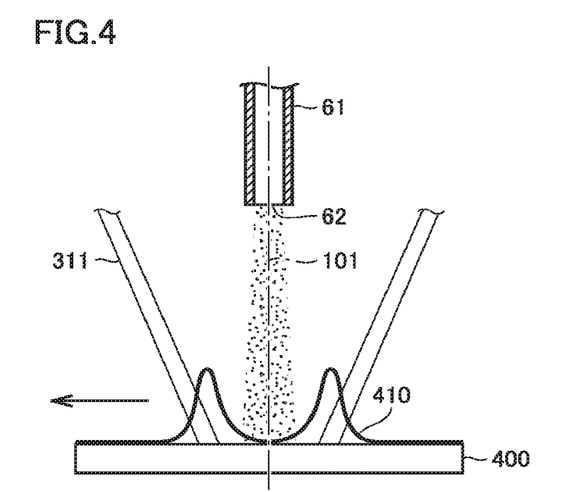
FIG. 4 is a cross-sectional view showing a surface of a workpiece during additive manufacturing.
Figure 5:
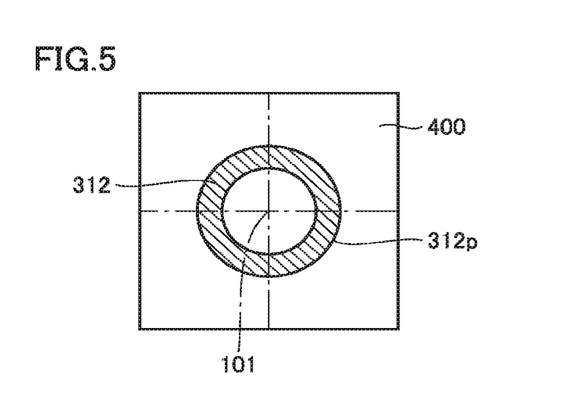
FIG. 5 is a plan view of the surface of the workpiece in FIG. 4.

FIG. 4 is a cross-sectional view showing a surface of a workpiece during additive manufacturing. FIG. 5 is a plan view of the surface of the workpiece in FIG. 4.

Referring to FIGS. 4 and 5, ring-shape laser beam 311 is emitted from laser beam emitting unit 34 toward workpiece 400 to thereby form laser-beam-irradiated region 312 on a surface of the workpiece. The material powder is released from outlet 62 of material powder feeding tube 61 to thereby feed, from inside ring-shape laser beam 311 which is emitted toward workpiece 400, the material powder to a region on the workpiece surface, the region including the range located inside outer circumference 312p of laser-beam-irradiated region 312.

Movement of tool spindle 121 to which additive-manufacturing head 21 is attached and/or rotation of first headstock 111 (first spindle 112) which holds workpiece 400 cause additive-manufacturing head 21 and workpiece 400 to move relative to each other with additive-manufacturing head 21 facing workpiece 400. At this time, the step of emitting ring-shape laser beam 311 toward workpiece 400 and the step of feeding the material powder toward the workpiece surface are simultaneously performed to thereby melt and attach the material powder to the workpiece surface.

A curve 410 in FIG. 4 represents a normalized laser beam intensity distribution on a workpiece surface.

Next, a description is given of a mechanism for controlling the size of a laser-beam-irradiated region on a workpiece.

Referring to FIG. 3, additive-manufacturing head 21 includes a lens moving mechanism (first moving mechanism) 81 and a tube moving mechanism (second moving mechanism) 86.

Lens moving mechanism 81 is connected to convex lens 44. Lens moving mechanism 81 moves convex lens 44 in the optical axis direction of the laser beam (axial direction of central axis 102).

Lens moving mechanism 81 is not particularly limited as long as it is capable of controlling the movement distance of convex lens 44. For example, any known motor drive for the auto focus lens may be used as lens moving mechanism 81.

Tube moving mechanism 86 is connected to material powder feeding tube 61. Tube moving mechanism 86 moves material powder feeding tube 61 in such a manner that the distance between its outlet 62 and a workpiece is changed. Tube moving mechanism 86 moves material powder feeding tube 61 in the optical axis direction of the ring-shape laser beam emitted from additive-manufacturing head 21 (in the axial direction of central axis 101).

Tube moving mechanism 86 is not particularly limited as long as it is capable of controlling the movement distance of material powder feeding tube 61. For example, a motor drive or a hydraulic or pneumatic drive mechanism may be used as tube moving mechanism 86. Material powder feeding tube 61 may be equipped with a mechanism (e.g., bellows mechanism) for absorbing elongation and contraction of the tube while being moved by tube moving mechanism 86.

Figure 6:
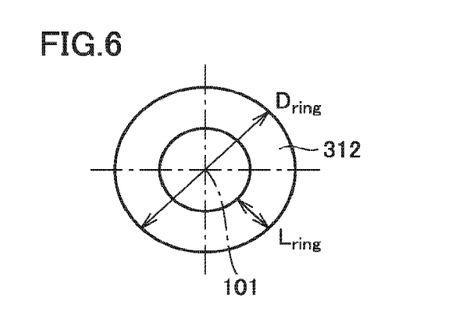
FIG. 6 is a diagram showing the size of a laser-beam-irradiated region on a workpiece.
Figure 7:
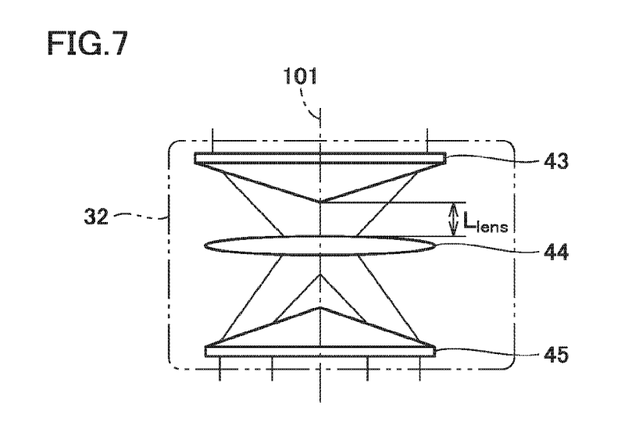
FIG. 7 is a diagram showing a position of a convex lens in the additive-manufacturing head in FIG. 3.
Figure 8:
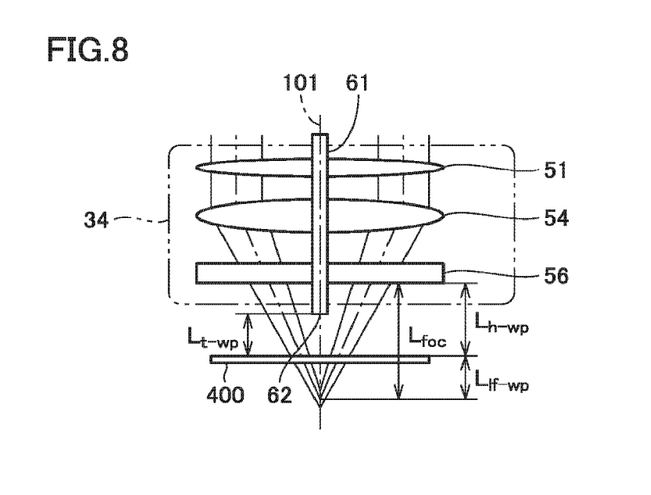
FIG. 8 is a diagram showing a positional relation between a laser beam emitting unit and a workpiece in the additive-manufacturing head in FIG. 3.

FIG. 6 is a diagram showing the size of a laser-beam-irradiated region on a workpiece. FIG. 7 is a diagram showing a position of the convex lens in the additive-manufacturing head in FIG. 3. FIG. 8 is a diagram showing a positional relation between a workpiece and the laser beam emitting unit in the additive-manufacturing head in FIG. 3.

Referring to FIG. 6, laser-beam-irradiated region 312 on the workpiece has a diameter (outer diameter) referred to herein as "$D_{ring}$" (also referred to as "ring spot diameter $D_{ring}$" hereinafter). Laser-beam-irradiated region 312 on the workpiece has a radial thickness referred to herein as "$L_{ring}$" (also referred to as "ring thickness $L_{ring}$" hereinafter). As ring spot diameter $D_{ring}$ and ring thickness $L_{ring}$ are determined, the size of laser-beam-irradiated region 312 on the workpiece is determined.

FIG. 6 shows laser-beam-irradiated region 312 having a ring shape. Alternatively, the laser-beam-irradiated region on the workpiece may have a circular shape.

Referring to FIG. 7, in ring-shape laser beam forming unit 32 of additive-manufacturing head 21, the distance between axicon lens 43 and convex lens 44 in the optical axis direction of the laser beam is referred to herein as "$L_{lens}$" (also referred to as "inter-lens distance $L_{lens}$" hereinafter).

The value of inter-lens distance $L_{lens}$ changes with movement of convex lens 44 by lens moving mechanism 81 in FIG. 3. Meanwhile, the distance between axicon lens 43 and axicon lens 45 in the optical axis direction of the laser beam remains constant.

Referring to FIG. 8, the distance between laser beam emitting unit 34 (specifically protective lens 56) and the focal position of the ring-shape laser beam emitted from laser beam emitting unit 34 is referred to herein as "$L_{foc}$" (also referred to as "focal length $L_{foc}$" hereinafter). The distance between a workpiece (specifically a workpiece surface subjected to additive manufacturing) and the focal position of the ring-shape laser beam emitted from laser beam emitting unit 34 is referred to herein as "$L_{lf\text{-}wp}$" (also referred to as "focus-workpiece distance $L_{lf\text{-}wp}$" hereinafter). The distance between laser beam emitting unit 34 (specifically protective lens 56) and the workpiece (specifically a workpiece surface subjected to additive manufacturing) is referred to herein as "$L_{h\text{-}wp}$" (also referred to as "workpiece distance $L_{h\text{-}wp}$" hereinafter). The following relation holds: workpiece distance $L_{h\text{-}wp}$=focal length $L_{foc}$–focus-workpiece distance $L_{lf\text{-}wp}$.

The distance between outlet 62 of material powder feeding tube 61 and the workpiece (specifically a workpiece surface subjected to additive manufacturing) is referred to herein as "$L_{t\text{-}wp}$" (also referred to as "tube-workpiece distance $L_{t-wp}$" hereinafter). The value of tube-workpiece distance $L_{t-wp}$ changes with movement of material powder feeding tube 61 by tube moving mechanism 86 in FIG. 3.

The laser beam emitted toward workpiece 400 has a converging section in which the laser beam converges as the distance to the focal position decreases, and a diverging section in which the laser beam diverges as the distance from the focal position increases. In the example shown in FIG. 8, workpiece 400 is positioned in the converging section of the laser beam. In the case where workpiece 400 is positioned near the focal position, the laser-beam-irradiated region on the workpiece is circular.

Figure 9:
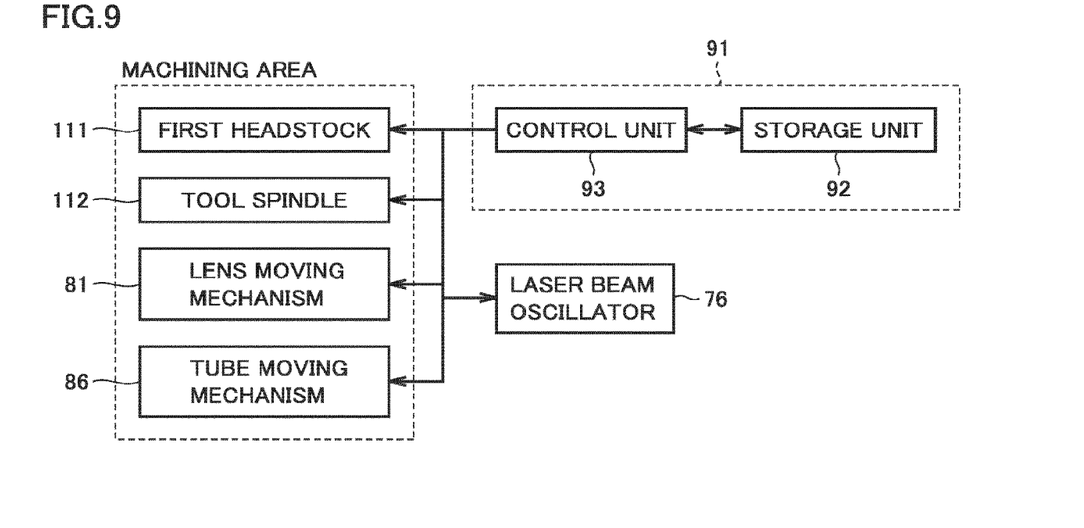
FIG. 9 is a block diagram showing a mechanism for controlling the size of a laser-beam-irradiated region on a workpiece.

FIG. 9 is a block diagram showing a mechanism for controlling the size of a laser-beam-irradiated region on a workpiece.

Referring to FIGS. 3 and 6 to 9, manufacturing machine 100 includes a controller 91. Controller 91 is typically a control board (control panel) mounted on manufacturing machine 100.

Controller 91 controls movement of convex lens 44 by lens moving mechanism 81, movement of additive-manufacturing head 21 by tool spindle 121, and movement of a workpiece by first headstock 111. Controller 91 includes a storage unit 92 and a control unit 93.

Storage unit 92 stores data regarding respective relations of workpiece distance $L_{h-wp}$ and inter-lens distance $L_{lens}$, to the size (ring spot diameter $D_{ring}$, ring thickness $L_{ring}$) of a laser-beam-irradiated region formed on a workpiece.

Control unit 93 specifies the size (ring spot diameter $D_{ring}$, ring thickness $L_{ring}$) of a laser-beam-irradiated region to be formed on a workpiece. The size of the laser-beam-irradiated region to be formed on the workpiece is specified by inputting ring spot diameter $D_{ring}$ and ring thickness $L_{ring}$ through an operation panel of manufacturing machine 100, for example.

Control unit 93 checks the specified size (ring spot diameter $D_{ring}$, ring thickness $L_{ring}$) of the laser-beam-irradiated region against the data stored in storage unit 92 to thereby determine workpiece distance $L_{h-wp}$ and inter-lens distance $L_{lens}$.

Control unit 93 controls driving of at least one of tool spindle 121 and first headstock 111 (first spindle 112) so that the determined workpiece distance $L_{h-wp}$ is obtained. Control unit 93 controls driving of lens moving mechanism 81 so that the determined inter-lens distance $L_{lens}$ is obtained.

Figure 10:
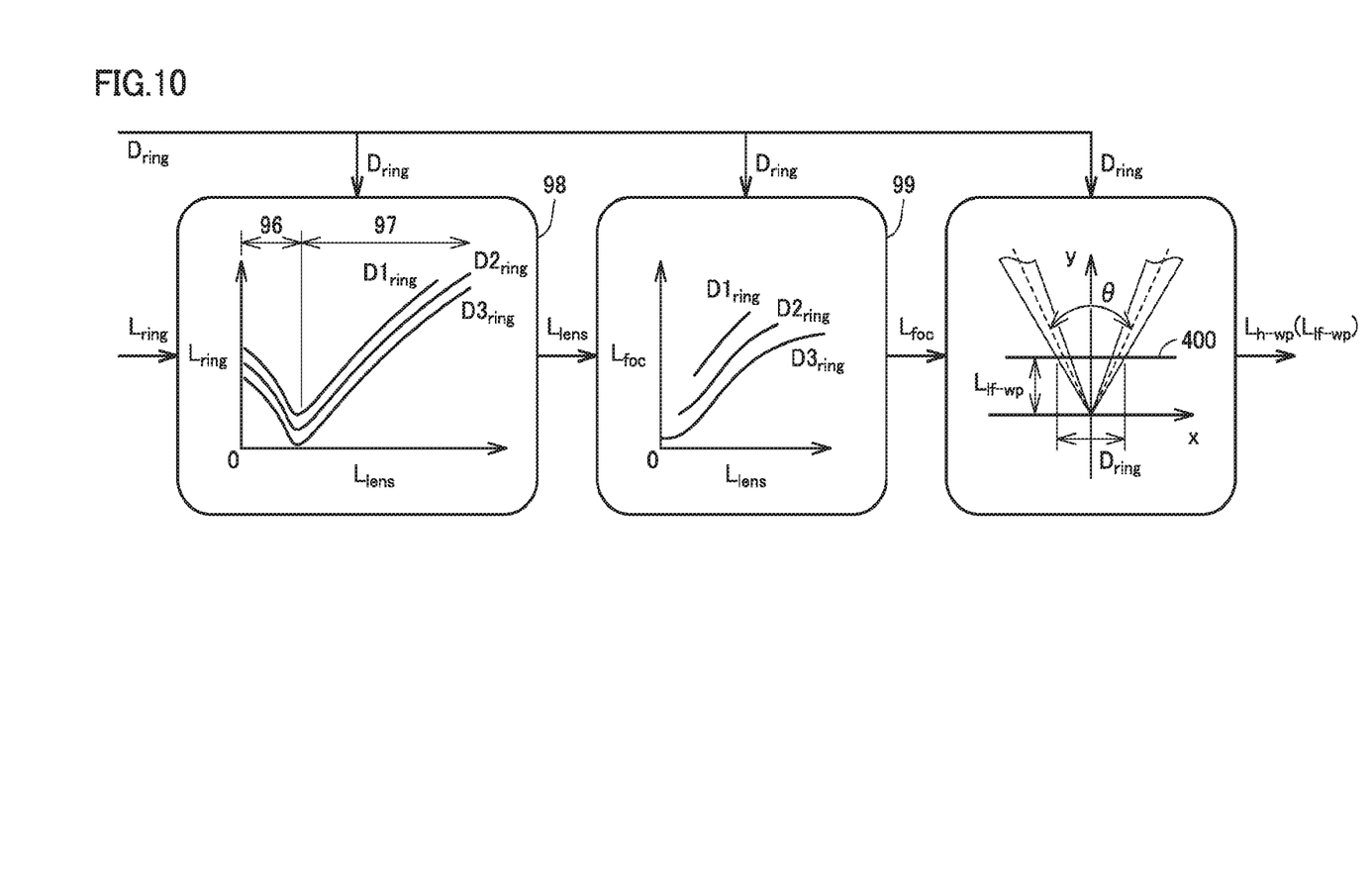
FIG. 10 is a diagram showing a more specific example of the method for controlling the size of a laser-beam-irradiated region on a workpiece.

FIG. 10 is a diagram showing a more specific example of the method for controlling the size of a laser-beam-irradiated region on a workpiece.

Referring to FIG. 10, storage unit 92 stores a graph 98 showing a relation between inter-lens distance $L_{lens}$ and ring thickness $L_{ring}$ for each of ring spot diameters $D1_{ring}$, $D2_{ring}$, and $D3_{ring}$, and a graph 99 showing a relation between inter-lens distance $L_{lens}$ and focal length $L_{foc}$ for each of ring spot diameters $D1_{ring}$, $D2_{ring}$, and $D3_{ring}$.

First, control unit 93 specifies ring spot diameter $D_{ring}$ (one of $D1_{ring}$, $D2_{ring}$, and $D3_{ring}$ in this case) and ring thickness $L_{ring}$ of a laser-beam-irradiated region to be formed on a workpiece. Then, control unit 93 refers to graph 98 to determine the value of inter-lens distance $L_{lens}$ by identifying, on the curve of ring spot diameter $D_{ring}$ specified in the preceding step, a point corresponding to the value of ring thickness $L_{ring}$ specified in the preceding step.

Next, control unit 93 refers to graph 99 to determine the value of focal length $L_{foc}$ by identifying, on the curve of ring spot diameter $D_{ring}$ specified in the preceding step, a point corresponding to the value of inter-lens distance $L_{lens}$ determined in the preceding step. Then, based on the value of focal length $L_{foc}$ determined in the preceding step, control unit 93 determines the position of workpiece 400 where the value of ring spot diameter $D_{ring}$ specified in the preceding step is obtained.

Through the foregoing steps, control unit 93 determines workpiece distance $L_{h-wp}$ (focus-workpiece distance $L_{lf-wp}$) and inter-lens distance $L_{lens}$ where the laser-beam-irradiated region on the workpiece has the size of the specified ring spot diameter $D_{ring}$ and ring thickness $L_{ring}$.

The size of the ring-shape laser beam (both the outer diameter and the inner diameter) varies depending on the distance from the laser beam focal position. Therefore, mere adjustment of the distance between the additive-manufacturing head 21 and the workpiece is not enough to enable the size of the laser-beam-irradiated region on the workpiece to be set to a desired size. In the present embodiment, additive-manufacturing head 21 is equipped with lens moving mechanism 81 for moving convex lens 44 in the optical axis direction of the laser beam so that the size of the laser-beam-irradiated region on the workpiece is freely controllable.

Controller 91 further controls the output of the laser beam generated by laser beam oscillator 76 in FIG. 1. Control unit 93 may determine the output of the laser beam from laser beam oscillator 76 so that the energy density per unit area of the laser-beam-irradiated region as well as the melt pool temperature are constant when the laser-beam-irradiated region is changed.

With such a configuration, the deposition efficiency of material powder on the workpiece can be kept constant even when the laser-beam-irradiated region on the workpiece is changed during additive manufacturing for the workpiece.

Referring to graph 98 in FIG. 10 showing a relation between inter-lens distance $L_{lens}$ and ring thickness $L_{ring}$, ring thickness $L_{ring}$ changes in a first section 96 in which its value decreases gradually toward a local minimum and a second section 97 in which its value increases gradually from the local minimum, as inter-lens distance $L_{lens}$ increases. The rate of change of ring thickness $L_{ring}$ in second section 97 is smaller than the rate of change of ring thickness $L_{ring}$ in first section 96. In other words, the slope of the curve of graph 98 in second section 97 is gentler than the slope of the curve in first section 96.

When control unit 93 uses such a graph 98 to determine inter-lens distance $L_{lens}$ corresponding to a specified value of ring thickness $L_{ring}$, there may be respective values, in first section 96 and second section 97, of inter-lens distance $L_{lens}$ corresponding to the specified value of ring thickness $L_{ring}$. In this case, preferably control unit 93 determines the value in the range of second section 97 as a value of inter-lens distance $L_{lens}$ corresponding to specified ring thickness $L_{ring}$.

With such a configuration, the ring-shape laser beam thickness (ring thickness $L_{ring}$) can be controlled with higher precision.

It should be noted that the present invention does not exclude that control unit 93 determines the value in the range of first section 96 as a value of inter-lens distance $L_{lens}$ corresponding to specified lens thickness $L_{ring}$.

Storage unit 92 may store data regarding a relation between the intensity distribution of the laser beam of a spot on a workpiece (curve 410 of a bimodal normal (Gaussian) distribution in FIG. 4) and the size of the laser-beam-irradiated region formed on the workpiece (ring spot diameter $D_{ring}$, ring thickness $L_{ring}$).

In this case, in specifying the size (ring spot diameter $D_{ring}$, ring thickness $L_{ring}$) of the laser-beam-irradiated region to be formed on the workpiece, control unit 93 may consider the intensity distribution of the laser beam of the spot on the workpiece. Control unit 93 controls the intensity distribution of the laser beam of the spot on the workpiece by changing ring thickness $L_{ring}$ with respect to input ring spot diameter $D_{ring}$ or changing ring spot diameter $D_{ring}$ with respect to input ring thickness $L_{ring}$.

Referring to FIGS. 3, 8, and 9, controller 91 controls movement of material powder feeding tube 61 by tube moving mechanism 86.

With movement of material powder feeding tube 61 by tube moving mechanism 86, the value of tube-workpiece distance $L_{t-wp}$ changes. Then, the diffusion range of the material powder on the workpiece changes. Control unit 93 controls driving of tube moving mechanism 86 so that the diffusion range of the material powder is optimized for the laser-beam-irradiated region on the workpiece. With such a configuration, additive manufacturing for a workpiece can be performed more efficiently.

Figure 11:
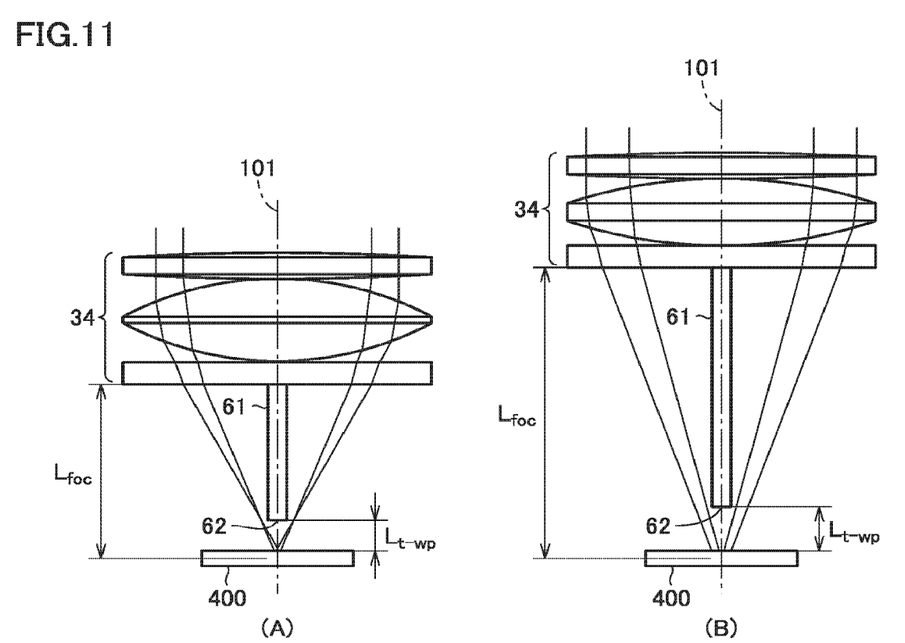
FIG. 11 is a diagram showing a relation between laser beam focal length $L_{foc}$ and tube-workpiece distance $L_{t-wp}$.

FIG. 11 is a diagram showing a relation between laser beam focal length $L_{foc}$ and tube-workpiece distance $L_{t-wp}$. FIG. 11(A) shows a case where laser beam focal length $L_{foc}$ is relatively short, and FIG. 11(B) shows a case where laser beam focal length $L_{foc}$ is relatively long.

Referring to FIG. 11, in order to increase the amount of material powder deposited on the workpiece, preferably tube-workpiece distance $L_{t-wp}$ is shorter. If, however, outlet 62 of material powder feeding tube 61 is excessively close to the workpiece surface, there arises a possibility that the front end of material powder feeding tube 61 interferes with the laser beam. As the value of focal length $L_{foc}$ of the laser beam increases, the angle of the front end of the laser beam decreases, and the front end of material powder feeding tube 61 is more likely to interfere with the laser beam.

In view of the above, control unit 93 may determine tube-workpiece distance $L_{t-wp}$ based on laser beam focal length $L_{foc}$ determined from graph 99 in FIG. 10, so that the maximum amount of material powder is deposited on the workpiece, while interference between material powder feeding tube 61 and the laser beam is avoided.

Figure 12:
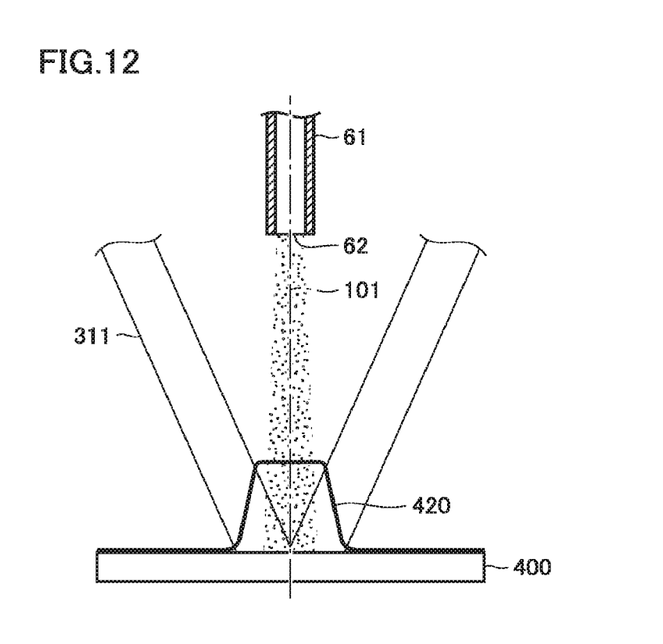
FIG. 12 is a cross-sectional view showing a modification of the workpiece surface during additive manufacturing in FIG. 4.
Figure 13:
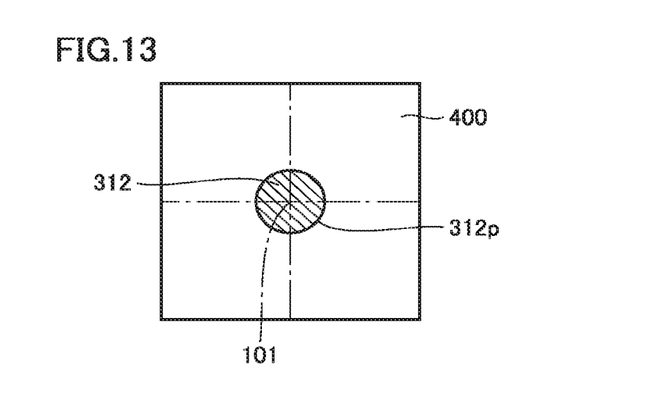
FIG. 13 is a plan view showing the workpiece surface in FIG. 12.

FIG. 12 is a cross-sectional view showing a modification of the workpiece surface during additive manufacturing in FIG. 4. FIG. 13 is a plan view showing the workpiece surface in FIG. 12.

Referring to FIGS. 12 and 13, in the present modification, workpiece 400 is positioned in the vicinity of the focal position of ring-shape laser beam 311 to thereby form a circular laser-beam-irradiated region 312 on the workpiece surface.

At this time, control unit 93 controls driving of lens moving mechanism 81 so that a laser beam intensity distribution in a top hat shape (curve 420 in FIG. 12) is obtained on the workpiece surface. Specifically, the ring thickness of ring-shape laser beam 311 emitted toward workpiece 400 is increased to thereby obtain the laser beam intensity distribution in the top hat shape.

Regarding the top hat shape of the profile having a flat top, the laser intensity in laser-beam-irradiated region 312 is more uniform as compared with a Gaussian shape of a profile having a sharp top, and therefore, additive manufacturing for a workpiece can be performed in a more stable manner.

The basic structure of additive-manufacturing head 21 and manufacturing machine 100 in the embodiment of the present invention is summarized in the following. Additive-manufacturing head 21 in the present embodiment performs additive manufacturing by feeding material powder to a workpiece and irradiating the workpiece with a laser beam. Additive-manufacturing head 21 includes: ring-shape laser beam forming unit 32 having axicon lens 43 as a first axicon lens and axicon lens 45 as a second axicon lens disposed to face each other in an optical axis direction of the laser beam, and convex lens 44 disposed between axicon lens 43 and axicon lens 45, to form the laser beam entering through axicon lens 43 into a ring-shape laser beam and emit the ring-shape laser beam from axicon lens 45; lens moving mechanism 81 as a first moving mechanism to move convex lens 44 in the optical axis direction of the laser beam; laser beam emitting unit 84 to emit the ring-shape laser beam toward the workpiece; and material powder feeding tube 61 as a material feeding unit having outlet 62 which is disposed inside the ring-shape laser beam emitted from laser beam emitting unit 34 and from which the material powder is released, to feed the material powder from outlet 62 toward the workpiece.

Manufacturing machine 100 according to the present embodiment is a manufacturing machine capable of additive manufacturing for a workpiece. Manufacturing machine 100 includes: additive-manufacturing head 21; tool spindle 121 and first headstock 111 as a third moving mechanism to move at least one of additive-manufacturing head 21 and the workpiece; and controller 91 to control movement of convex lens 44 by lens moving mechanism 81 and movement of additive-manufacturing head 21 and the workpiece by tool spindle 121 and first headstock 111. Controller 91 includes: storage unit 92 to store data regarding respective relations of a distance between the workpiece and laser beam emitting unit 34 and a distance between axicon lens 43 and convex lens 44 in the optical axis direction of the laser beam, to a size of a laser-beam-irradiated region formed on the workpiece; and control unit 93 to determine the distance between the workpiece and laser beam emitting unit 34 and the distance between axicon lens 43 and convex lens 44 in the optical axis direction of the laser beam, by specifying a size of the laser-beam-irradiated region to be formed on the workpiece and checking the specified laser-beam-irradiated region against the data stored in storage unit 92.

Additive-manufacturing head 21 and manufacturing machine 100 in the embodiment of the present embodiment configured in the above-described manner is capable of freely controlling the size of the laser-beam-irradiated region on the workpiece.

Although manufacturing machine 100 capable of additive manufacturing and subtractive manufacturing is described above in connection with the present embodiment, the present invention is also applicable to a manufacturing machine capable of additive manufacturing only.

It should be construed that embodiments disclosed herein are given by way of illustration in all respects, not by way of limitation. It is intended that the scope of the present invention is defined by claims, not by the description above, and encompasses all modifications and variations equivalent in meaning and scope to the claims.

INDUSTRIAL APPLICABILITY

The present invention is mainly applied to additive manufacturing based on the directed energy deposition method.

REFERENCE SIGNS LIST 21 additive-manufacturing head; 24 cable; 26 cover body; 27 opening; 31 laser beam collimating unit; 32 ring-shape laser beam forming unit; 33 laser beam guiding unit; 34 laser beam emitting unit; 41 optical fiber; 42 collimation lens; 43, 45 axicon lens; 43m, 45m one surface; 43n, 45n the other surface; 44 convex lens; 46, 47 guide mirror; 48, 52, 55, 57 through hole; 51, 54 condenser lens; 56 protective lens; 61 material powder feeding tube; 62 outlet; 70 powder feeder; 71 mixing unit; 72 powder hopper; 76 laser beam oscillator; 81 lens moving mechanism; 86 tube moving mechanism; 91 controller; 92 storage unit; 93 control unit; 96 first section; 97 second section; 98, 99 graph; 100 manufacturing machine; 101, 102, 201, 202, 203, 204, 206 central axis; 111 first headstock; 112 first spindle; 116 second headstock; 117 second spindle; 121 tool spindle; 131 tool rest; 132 swivel unit; 136 bed; 200 machining area; 210 splash guard; 311 laser beam; 312 laser-beam-irradiated region; 312p outer circumference; 400 workpiece; 410 curved line

The invention claimed is:

1. An additive-manufacturing head for performing additive manufacturing by feeding material powder to a workpiece and irradiating the workpiece with a laser beam, the additive-manufacturing head comprising:
a ring-shape laser beam forming unit including a first axicon lens comprising a planar surface and a conical surface, a second axicon lens comprising a conical surface and a planar surface disposed to face each other in an optical axis direction of the laser beam so that the conical surface of the first axicon lens faces the conical surface of the second axicon lens, and a convex lens disposed between the first axicon lens and the second axicon lens, to form the laser beam entering through the first axicon lens into a ring-shape laser beam and emit the ring-shape laser beam from the second axicon lens;
a first moving mechanism that moves the convex lens in the optical axis direction of the laser beam;
a laser beam emitting unit that emits the ring-shape laser beam toward the workpiece; and
a material feeding unit having an outlet which is disposed inside the ring-shape laser beam emitted from the laser beam emitting unit and from which the material powder is released, to feed the material powder from the outlet toward the workpiece.

2. The additive-manufacturing head according to claim 1, further comprising a second moving mechanism that moves the material feeding unit so that a distance between the outlet and the workpiece is changed.

3. A manufacturing machine for additive manufacturing for a workpiece, the manufacturing machine comprising:
an additive-manufacturing head according to claim 1;
a third moving mechanism that moves at least one of the additive-manufacturing head and the workpiece; and
a first controller that controls movement of the convex lens by the first moving mechanism and movement of at least one of the additive-manufacturing head and the workpiece by the third moving mechanism,
the first controller including:
a first storage that stores data regarding respective relations of a distance between the workpiece and the laser beam emitting unit and a distance between the first axicon lens and the convex lens in the optical axis direction of the laser beam, to a size of a laser-beam-irradiated region formed on the workpiece; and
a second controller that determines the distance between the workpiece and the laser beam emitting unit and the distance between the first axicon lens and the convex lens in the optical axis direction of the laser beam, by specifying a size of the laser-beam-irradiated region to be formed on the workpiece and checking the specified laser-beam-irradiated region against the data stored in the first storage.

4. The manufacturing machine according to claim 3, further comprising a laser beam oscillator that generates the laser beam traveling toward the ring-shape laser beam forming unit, wherein
the first controller further controls output of the laser beam generated by the laser beam oscillator, and
the second controller determines the output of the laser beam so that an energy density per unit area of the laser-beam-irradiated region and a melt pool temperature are constant when the laser-beam-irradiated region is changed.

5. The manufacturing machine according to claim 3, wherein
as the distance between the first axicon lens and the convex lens in the optical axis direction of the laser beam increases, a thickness of the ring-shape laser beam in radial direction changes in a first section in which the thickness decreases gradually toward a local minimum and a second section in which the thickness increases gradually from the local minimum,
a rate of change of the thickness of the ring-shape laser beam in the second section is smaller than a rate of change of the thickness of the ring-shape laser beam in the first section, and
based on the data stored in the first storage, the second controller determines a distance in the second section as the distance between the first axicon lens and the convex lens in the optical axis direction of the laser beam.

6. A manufacturing machine for additive manufacturing for a workpiece, the manufacturing machine comprising:
an additive-manufacturing head according to claim 2;
a third moving mechanism that moves at least one of the additive-manufacturing head and the workpiece; and
a third controller that controls movement of the convex lens by the first moving mechanism and movement of at least one of the additive-manufacturing head and the workpiece by the third moving mechanism,
the third controller including:
a second storage that stores data regarding respective relations of a distance between the workpiece and the laser beam emitting unit and a distance between the first axicon lens and the convex lens in the optical axis direction of the laser beam, to a size of a laser-beam-irradiated region formed on the workpiece; and
a fourth controller that determines the distance between the workpiece and the laser beam emitting unit and the distance between the first axicon lens and the convex lens in the optical axis direction of the laser beam, by specifying a size of the laser-beam-irradiated region to be formed on the workpiece and checking the specified laser-beam-irradiated region against the data stored in the second storage.

7. The manufacturing machine according to claim 4, wherein
as the distance between the first axicon lens and the convex lens in the optical axis direction of the laser beam increases, a thickness of the ring-shape laser beam in radial direction changes in a first section in which the thickness decreases gradually toward a local minimum and a second section in which the thickness increases gradually from the local minimum, a rate of change of the thickness of the ring-shape laser beam in the second section is smaller than a rate of change of the thickness of the ring-shape laser beam in the first section, and based on the data stored in the first storage, the second controller determines a distance in the second section as the distance between the first axicon lens and the convex lens in the optical axis direction of the laser beam.

* * * * *